3,433,290
PRESSURE-TYPE DIECASTING MACHINE WITH SCREW THREADED ADJUSTMENT OF MOLD HALVES
Ulrich Eggenberger and Karl A. Neuenschwander, Oberuzwil, Saint Gall, Switzerland, assignors to Gebruder Buhler, Uzwil, Switzerland
Filed Jan. 21, 1966, Ser. No. 522,263
Claims priority, application Switzerland, Jan. 29, 1965, 1,248/65
U.S. Cl. 164—303       10 Claims
Int. Cl. B22d 17/00; B29f 1/022

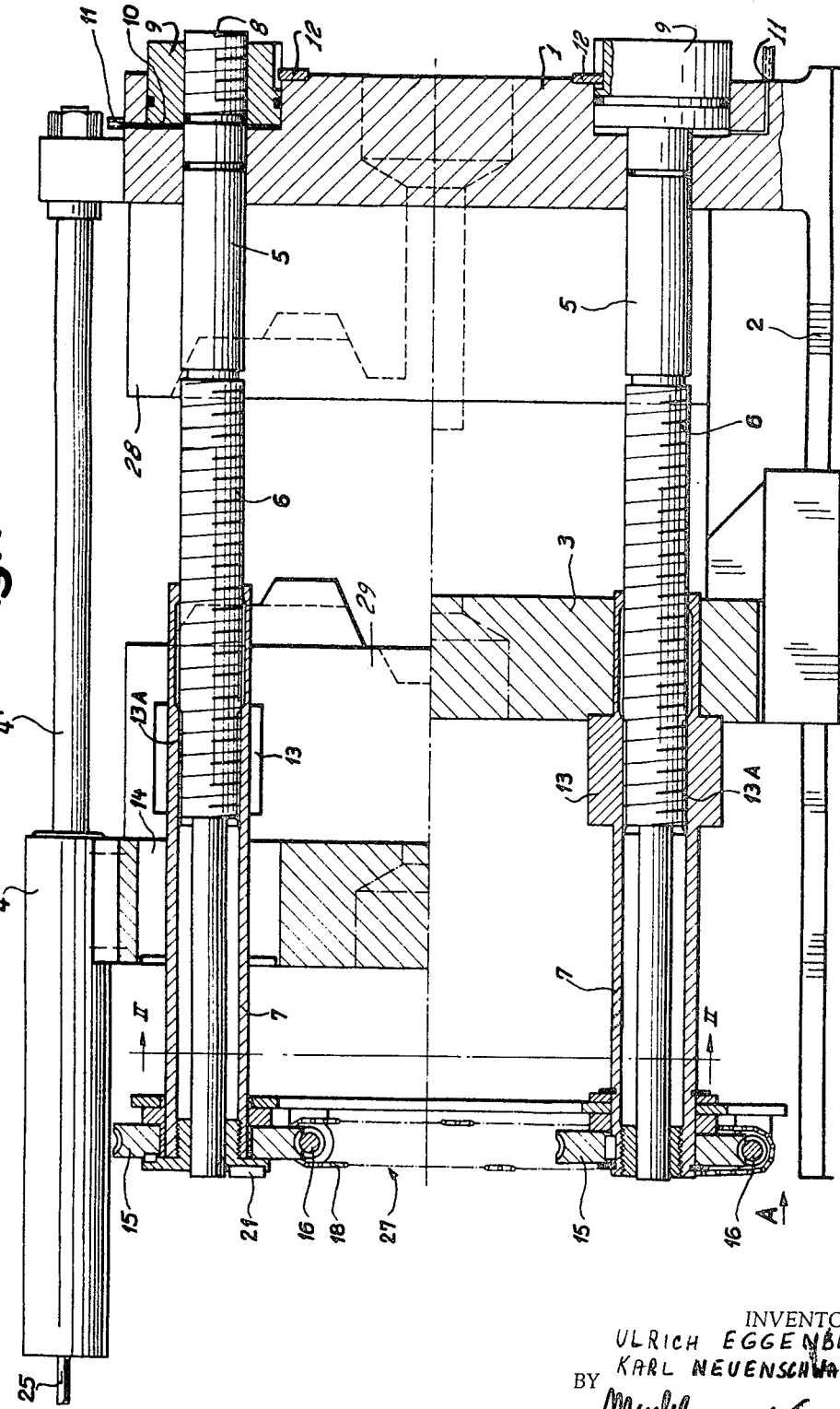

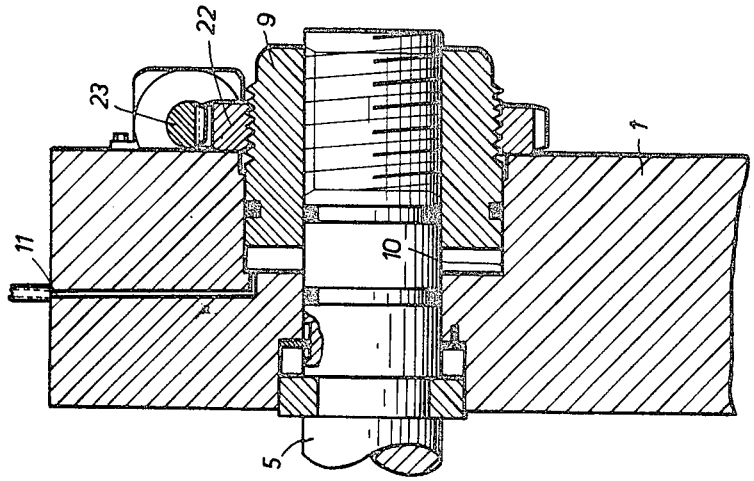
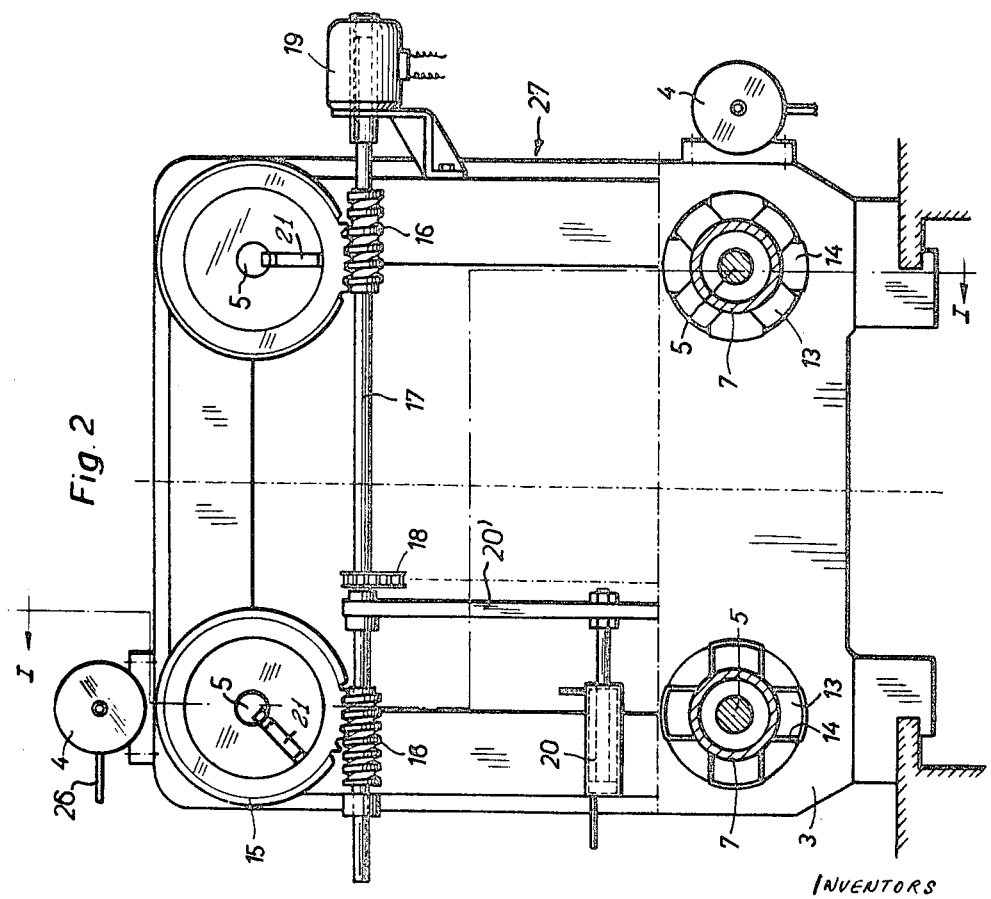

ABSTRACT OF THE DISCLOSURE

A diecasting machine includes a frame, a stationary mold carrier fixed to said frame, a movable mold carrier movably mounted on said frame for movement relative to the fixed mold carrier between a mold closing and a mold opening position, and hydraulic actuator means connected between the fixed and movable mold carriers for effecting such movement. Plural rods have fixed ends secured to the stationary mold carrier, and extend through openings in the movable mold carrier with free ends of the rods projecting substantially beyond the movable mold carrier. Nut members are associated with the rods and each includes a sleeve having an end engaged in the movable mold carrier with each sleeve extending beyond the movable mold carrier, in mutually supporting relation with their respective rod, throughout the projecting free length of their respective rod. The nut members are threadedly engaged with the rods, and include projections normally abutting against that side of the movable carrier facing away from the fixed carrier. The movable carrier is formed with channels extending therethrough and alignable with the projections on the nut members by rotation of the nut members so that the movable carrier may move along the nut members toward and away from the fixed carrier. Common driving means are provided to conjointly rotate all of the nut members in either selected direction, and the common drive means include fluid pressure actuated means selectively operable to move the nut members through selected arcs to either align the projections with the channels or move the projections out of alignment with the channels. Fluid pressure actuator means are operable between the fixed carrier and the rods to exert a closing pressure on the two mold halves carried by the mold carriers.

The present invention relates to an improved diecasting machine, which includes those of the pressure type.
The invention is described in detail in the following paragraphs, with reference to the drawings, wherein:
FIGURE 1 is a cross sectional view of the diecasting machine of the invention, taken on the line I—I of FIG. 2;
FIGURE 2 is a cross sectional view of the machine, taken on the line II—II of FIG. 1 seen from the direction of arrow A in FIGURE 1; and
FIGURE 3 is a cross sectional view of a modification of a part of the invention.
Referring to FIGURE 1, the diecasting machine of the invention has a non-movable, rigidly mounted mold holder 1 and a mold holder 3 guided for movement, on the machine frame 2. Mold carriers 1 and 3 carry respective mold halves 28 and 29 which preferably are halves of multi-cavity molds. The upper part of the holder 3 is connected to a mold closing cylinder 4 having a double-acting piston (not shown) which can be fed a working fluid to act on its front or rear surface, via lines 25, 26. The end of the piston rod 4' remote from the movable holder 3 is secured to the stationary holder 1. As seen in FIGURE 2, a second cylinder and piston combination 4, 4' is located at the lower part of the mold holders 1, 3.

As shown in FIGURES 1 and 2, four coupling rods 5 pass through the two mold carriers. Each rod has a threaded length 6, located in the middle portion of the rod, cooperating with a nut 7, further described below. During injection, the nuts 7 serve as stops for the holder 3. Each of the ends of the rods 5 located at the holder 1 has threads 8. A piston 9, in the form of a cylindrical threaded nut, is screwed onto each of the threads 8. The pistons 9 protrude from the stationary mold holder 1 and move back and forth in respective cylindrical cavities 10 provided in to the holder 1 and open on the side remote from the carrier 3. The closing pressure is obtained by hydraulic fluid fed to the respective space formed by the carrier 1 and each piston 9 via respective lines 11. Stops 12 rigid with the carrier 1, limit the piston strokes in the rearward movement.

The nuts 7, which extend through the carrier 3, are in the form of cylindrical sleeves that have internal threads 13A spaced from either end of the sleeve and which engage the threads 6. The nuts 7 are thereby firmly supported by their rods 5. Approximately coextensive with the threads 13A are a series of equidistantly spaced circumferential stop members 13 extending radially from the nuts. Projecting radially from the bores in the carrier 3 through which the nuts 7 pass, are suitably arranged channels 14 that are of such a shape that, when a nut 7 is suitably positioned, they permit the movable carrier 3 to be shifted over the stops 13. The upper portion of FIGURE 1 is taken in cross section along a line through the channels 14.

A worm gear 15, meshing with a worm 16, is rigidly connected to each nut 7 at the end remote from the carrier 1. As seen at the upper portion of FIGURE 2, two worms 16 are rigidly mounted on a shaft 17 that is mounted for rotation and for movement in the direction of its length. A second shaft 17 and worm 16 combination, located at the lower portion of FIGURE 2, and not illustrated, is connected to the upper shaft 17 by a chain 18. By means of a cross connection, schematically illustrated at 20', between the two shafts 17, a double-acting hydraulic cylinder 20 can move the shafts 17 back and forth. An electric motor 19 is mounted on a platform supported by one of the nuts 7 and is so coupled to the upper shaft 17 that the shaft is turned by the motor but also is permitted to be moved back and forth.

In FIGURE 1, the diecasting machine is shown in the lower half of the position of the closed molds. The two halves of the mold, located between the two mold carriers 1 and 3 and carried thereby, are brought together. The stops 13 are not in alignment with the channels 14 and consequently bear against the carrier 3. The space formed between the carrier 1 and the pistons 9 is under fluid pressure. The two mold halves are thus held tightly together.

Opening of the mold after injection is accomplished in the following manner.

The pressure in the spaces between carrier 1 and pistons 9 is relieved. The shafts 17 are shifted longitudinally by the cylinder 20, causing the nuts 7 to be turned via the worms 16 and worn gears 15. The worm gears 15 and nuts 7 are thereby turned from their position as shown at the right-hand side of FIGURE 2 to that shown at the left-hand side of the figure, in which the stops 13 are aligned with the channels 14. By suitably putting cylinder 4 under pressure, the movable mold carrier 3 can then be moved backward over the nuts 7. The mold is thus opened and the casting can be removed from it by means not shown.

The mold is closed by the opposite sequence of steps.

In order that the pressure diecasting machine can accommodate molds of different height, the nuts 7 can be moved back and forth over the threads 6 by means of the motor 19, the entire rear assembly 27 of the machine, including the worm drives 16, 17, the hydraulic cylinder 20, etc., moving therewith.

To permit the mounting of very large molds, as explained below, means are provided for permitting removal of the rods 5 from the stationary mold carrier 1.

As shown in FIGURES 1 and 2, the driven end of each nut 7 is provided with a key 21 that is movable radially inwardly to couple the nut 7 with its associated rod 5 for conjoint rotation. When nuts 7 are coupled to rods 5 by keys 21, it is possible, by extended operation of the driving means 27, to unscrew the threaded portions 8 of rods 5 from the associated pistons 9. As the pistons 9 are fixed against rotation, the rods 5 are moved to the left as viewed in FIG. 1, during such unscrewing operation. It is thereafter possible to move the rods 5, thus separated from pistons 9, from the area of the space for the mold by moving the two mold carriers away from each other, as by displacing movable mold carrier 3 to the right relative to the combined drive 27.

A modification of the invention is shown in FIGURE 3, wherein each piston 9 is provided with external threads 24 on which a gear 22 is screwed. The gear 22 meshes with a motor driven gear rack 23 and serves to mechanically lock the rod 5 to the stationary mold carrier 1. In this way, the elasticity of the pressure fluid in the space between the carrier 1 and the piston 9 can be compensated for.

In regard to the prior art, the diecasting machine of the invention offers the following advantages.

The location of the mold closing hydraulic cylinder along the top of the machine permits a shorter machine. The frequently employed elbow joint system for shifting the movable mold carrier, as well as its rear support, can be eliminated, which greatly reduces the weight.

The space behind the movable mold carrier is left free, permitting installation of means for removing the cast article from the open mold or of a second injector.

With the same simple mechanical arrangement the pressure diecasting machine can be locked for diecasting, adjusted to the height of the mold, or have one or more rods removed.

It should further be noted that the rods are guided through the movable mold carrier by means of nuts, that the adjustment to mold height is continuous and centrally controlled, and that each rod is individually hydraulically supported.

We claim:

1. A diecasting machine comprising, in combination, a frame; a stationary mold carrier fixedly mounted on said frame; a movable mold carrier mounted on said frame in spaced relation to said stationary mold carrier and movable along said frame toward and away from said stationary mold carrier; each carrier having a remote side facing away from the other carrier; at least one fluid pressure actuator interconnecting said carriers and including a piston rod secured at one end to said stationary carrier and extending into a cylinder secured at one fixed end to said movable carrier and having a free end extending outwardly from said remote side of said movable carrier; a plurality of relatively elongated rods each having a fixed end anchored to and supported by said stationary mold carrier, and each having a free end extending through a respective opening in said movable mold carrier and projecting substantially beyond said remote side of said movable mold carrier; each rod having external threads along a portion of its length including that portion of the rod extending through said movable mold carrier; said rods being located laterally outside of the area occupied by mold halves of customary size carried by said mold carriers; a plurality of nut members, equal in number to said rods and each operatively associated with a respective rod, each nut member comprising a sleeve telescoped over and in mutually supporting relation with a respective rod and having one end engaged in said movable carrier, each sleeve extending beyond said remote side of said movable carrier a distance equal to the projecting free length of the associated rod, and projections on each sleeve normally abutting against said remote side of said movable carrier; the portion of each sleeve having said projections being internally threaded for cooperation with the external thread on the associated rod; common drive means connected to all of said nut members and operable to rotate said nut members in either one of two selected directions; said movable mold carrier being formed with channels extending therethrough and radially outwardly from each of the openings therein, said channels having cross sectional dimensions at least equal to those of said projections; said common drive means including means operable to move said nut members through a preselected arc to align said projections with said channels for movement of said movable mold carrier along said rods and along said nut members, by operation of said fluid pressure actuator and to return said projections to a position out of alignment with said channels and in abutment with said remote side of said movable carrier; and fluid pressure means operable between said fixed mold carrier and the fixed end of each rod to provide a mold closing pressure transmitted through said rods to said nut members and through said projections to said remote side of said movable mold carrier.

2. The diecasting machine of claim 1, in which said projections extend radially outwardly from said sleeves in the region of said internal thread and extend circumferentially over only a portion of the outer surface of each sleeve.

3. The diecasting machine of claim 2, wherein said common drive means is located at the free ends of said rods and is supported by said nut members.

4. The diecasting machine of claim 3, wherein said drive means includes a respective individual worm gear rigidly coupled to each nut member, respective worms for driving each worm gear, and means for driving the worms.

5. The diecasting machine of claim 4, wherein said means for driving said worms includes a motor operable to rotate the worms and fluid pressure means operable to oscillate the worms through a predetermined arc.

6. The diecasting machine of claim 5, wherein said rods are arranged in pairs, the worms for driving each pair being mounted on a common worm shaft; means interconnecting said worm shafts for conjoint rotation thereof; a cross connection extending between said worm shafts providing for rotation of said worm shafts but being fixed against axial displacement relative to said worm shafts; and a fluid pressure actuator connected between said movable mold carrier and said cross connection and operable, through said cross connection, to shift said worm shafts axially to oscillate said worm gears through a predetermined arc.

7. The diecasting machine of claim 2, wherein said fluid pressure means includes recesses, one for each rod, in said stationary mold carrier on the said side thereof remote from said movable mold carrier; and piston means anchored to said rods at said fixed ends thereof and moving in said recesses, said pistons and their respective recesses forming chambers for receiving a hydraulic fluid.

8. The diecasting machine of claim 7, wherein said fixed ends of the rods are threaded, and said pistons are screwed onto said fixed ends of the rods.

9. The diecasting machine of claim 8, including means selectively operable to interconnect each rod and its associated nut member; said selectively operable means, when operated to connect each rod with its associated nut member, providing for rotation of said rods by said common drive means for unthreading said rods from their associated pistons to provide for withdrawal of the rods.

10. The diecasting machine of claim 7, including external threads on each said piston; a spur gear for each piston cooperating with the external threads thereof and serving as a stop member for the respective rod by bearing on the said side of the stationary mold carrier remote from said movable mold carrier; and driven gear means for driving each spur gear.

References Cited
UNITED STATES PATENTS

| | | | |
|---|---|---|---|
| 2,268,949 | 1/1942 | Lehmann | 164—341 |
| 2,916,768 | 12/1959 | Quere et al. | 18—30 |
| 3,093,863 | 6/1963 | Ehlert | 18—30 |
| 3,120,039 | 2/1964 | Stubbe et al. | 18—30 |

J. SPENCER OVERHOLSER, *Primary Examiner.*

R. D. BALDWIN, *Assistant Examiner.*

U.S. Cl. X.R.

118—30; 164—341